US006814053B2

(12) United States Patent
Hawkins et al.

(10) Patent No.: US 6,814,053 B2
(45) Date of Patent: Nov. 9, 2004

(54) METHOD AND APPARATUS FOR LIMITING ENGINE OPERATION IN A PROGRAMMABLE RANGE

(75) Inventors: Jeffery Scott Hawkins, Framington Hills, MI (US); Kurt Joseph Couture, Farmington Hills, MI (US); Richard Michael Avery, Jr., West Bloomfield, MI (US); Ian Daniel McKenzie, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 94 days.

(21) Appl. No.: 10/289,097

(22) Filed: Nov. 6, 2002

(65) Prior Publication Data

US 2004/0084014 A1 May 6, 2004

(51) Int. Cl.⁷ ............................ F02D 31/00; F02B 75/06
(52) U.S. Cl. .................... 123/351; 123/357; 123/192.1; 701/111
(58) Field of Search ................................. 123/350, 351, 123/357, 358, 359, 395, 399, 192.1; 701/111

(56) References Cited

U.S. PATENT DOCUMENTS

| | | | | |
|---|---|---|---|---|
| 4,799,469 A | * | 1/1989 | Nagano et al. ......... 123/406.24 |
| 4,977,508 A | * | 12/1990 | Tanaka et al. .............. 701/111 |
| 5,161,174 A | | 11/1992 | Pigozzi |
| 5,639,960 A | * | 6/1997 | Nakagawa ................... 701/111 |
| 5,664,534 A | * | 9/1997 | Schmitz .................... 123/192.1 |
| 5,732,676 A | | 3/1998 | Weisman et al. |
| 5,957,109 A | * | 9/1999 | Schonfelder et al. ....... 123/357 |
| 5,978,729 A | | 11/1999 | Landes et al. |
| 6,286,473 B1 | * | 9/2001 | Zaremba ................... 123/192.1 |
| 6,427,112 B1 | * | 7/2002 | Kostun ....................... 701/111 |
| 6,629,025 B2 | * | 9/2003 | Evans et al. ............. 123/192.1 |
| 6,659,078 B2 | * | 12/2003 | Bergeon et al. .......... 123/192.1 |

* cited by examiner

Primary Examiner—Erik Solis
(74) Attorney, Agent, or Firm—Brooks Kushman P.C.

(57) ABSTRACT

An engine control system for a compression ignition engine employs a microprocessor-based controller that detects engine operation in a speed range previously determined to be undesirable, and responding to the detection by changing operation of the engine. In the preferred embodiment, the controller commands a parameter for adjusting engine operation to reach a different speed outside of first and second thresholds defining the undesirable range in a time period subsequent to the detection.

19 Claims, 6 Drawing Sheets

METHOD AND APPARATUS FOR LIMITING
ENGINE OPERATION IN A
PROGRAMMABLE RANGE

BACKGROUND OF THE INVENTION

1. Field of the Invention

The present invention relates to electronic control of compression ignition engines with electronic control modules programmable to define a range of engine speed operation having first and second thresholds, and adjusting engine operation within a range after detecting engine operation within a range between thresholds in a time interval.

2. Background Art

The many moving parts of a vehicle drivetrain or motorized machinery often induce harmonic vibrations throughout the drivetrain that can create severe vibration and stresses in the components, in the mounting structures and throughout the vehicle or machine carrying the engine. While mechanical dampers have often been employed to reduce the effect of operating the drivetrain at the speeds at which the harmonic amplification of destructive vibrations are induced, the addition of mass to the moving components or the machinery is often undesirable as such dampers may have limited effectiveness, may reduce the efficiency of the vehicle or machinery as a whole and may add to wear over the equipment's lifetime. The removal of destructive torsional forces within the normal operating range can be quite expensive.

Moreover, none of the previously known dampers were automatically responsive to electronic control modules effecting the ignition and operation of an engine. Accordingly, an operator could operate an engine at undesirable speeds for extended periods at which the induced vibrations may be amplified by harmonics that are destructive to the engine, adjacent components and the equipment carrying the engine. Accordingly, the previously known controls for internal combustion engines did not avoid the destructive effects of operating an engine in speed ranges considered undesirable for the equipment.

SUMMARY OF THE INVENTION

The present invention overcomes the abovementioned disadvantages by providing an electronic control system for an engine that can detect engine operation in a range considered to be undesirable and can control adjustment of the engine speed to avoid the undesirable range. The response may be a generation of a signal that accelerates the engine speed above or decelerates the engine speed below the thresholds defining a range defined as undesirable. Moreover, multiple ranges or thresholds may be programmed into the control or otherwise sensed as desired to avoid undesirable engine RPM ranges without unduly affecting the function of the vehicle or machinery employing the control.

In one embodiment, the time of engine operation in an undesirable speed range is limited by an add-on circuit that detects engine operation in the range and permits the control to command an automatic pass through the range in which two engine speed outputs, one associated with each threshold speed defining the range, one speed command and one torque or speed limit control module signal are combined with two relays and diode to perform the automatic pass through. Alternatively, a single speed switch output may enable a speed command permitting the engine to accelerate to a rated speed outside of the range. Such an embodiment may be preferable where simpler circuitry is desired, and operator intervention is available, for example, to switch engine speed to a lower operating speed, for example where an Enable Idle request is triggered by the operator. Such an alternative may require digital inputs of Variable Speed Governor (VSG) Inhibit and Alternative Minimum variable speed governor (VSG) as well as a digital output, for example, Speeds Switch Output, which is preferably provided by a speed switch output or Engine Overspeed control signal.

Another embodiment, that does not rely upon discrete circuitry to interface with the electronic control, may be employed by utilizing the timer based torque limiting operation previously programmed in Detroit Diesel marine engine controls and modified by reducing the power level command to a less than desirable power level when the engine operates in a speed range determined to be undesirable. This engine overload protection normally prohibits operation at torque levels above the normal propeller load curves for a prolonged period of time by temporarily maintaining acceleration performance, while protecting engine durability by ramping down engine output to the maximum allowed torque over time.

In addition, an embodiment of the present invention may be implemented in new software. The reprogramming of previously known electronic control modules, for example, reprogramming with a calibration parameter to enable an engine Speed Range Exclusion enable or grounding a digital input when a speed signal is in a range between first and second thresholds. A set speed table may force acceleration through the upper threshold so that the engine speed remains above the upper threshold level until the requested speed signal falls below the first threshold. Regardless of the embodiment employed, the present invention avoids engine operation in an undesirable range of speeds between upper and lower threshold speeds. The detector may be simply added circuitry employed to communicate with the electronic control module, or may be derived from signals already received by an electronic control module as processed in the reprogrammed microprocessor operation. As a result, the present invention substantially reduces destructive operation and promotes a longer working life for the vehicle or machinery operated with the control.

BRIEF DESCRIPTION OF THE DRAWING

The present invention will be more clearly understood by reference to the following detailed description of a preferred embodiment when read in conjunction with the accompanying drawing, in which like reference characters refer to like parts throughout the views, and in which.

DETAILED DESCRIPTION OF THE PREFERRED EMBODIMENT

Figure 1:
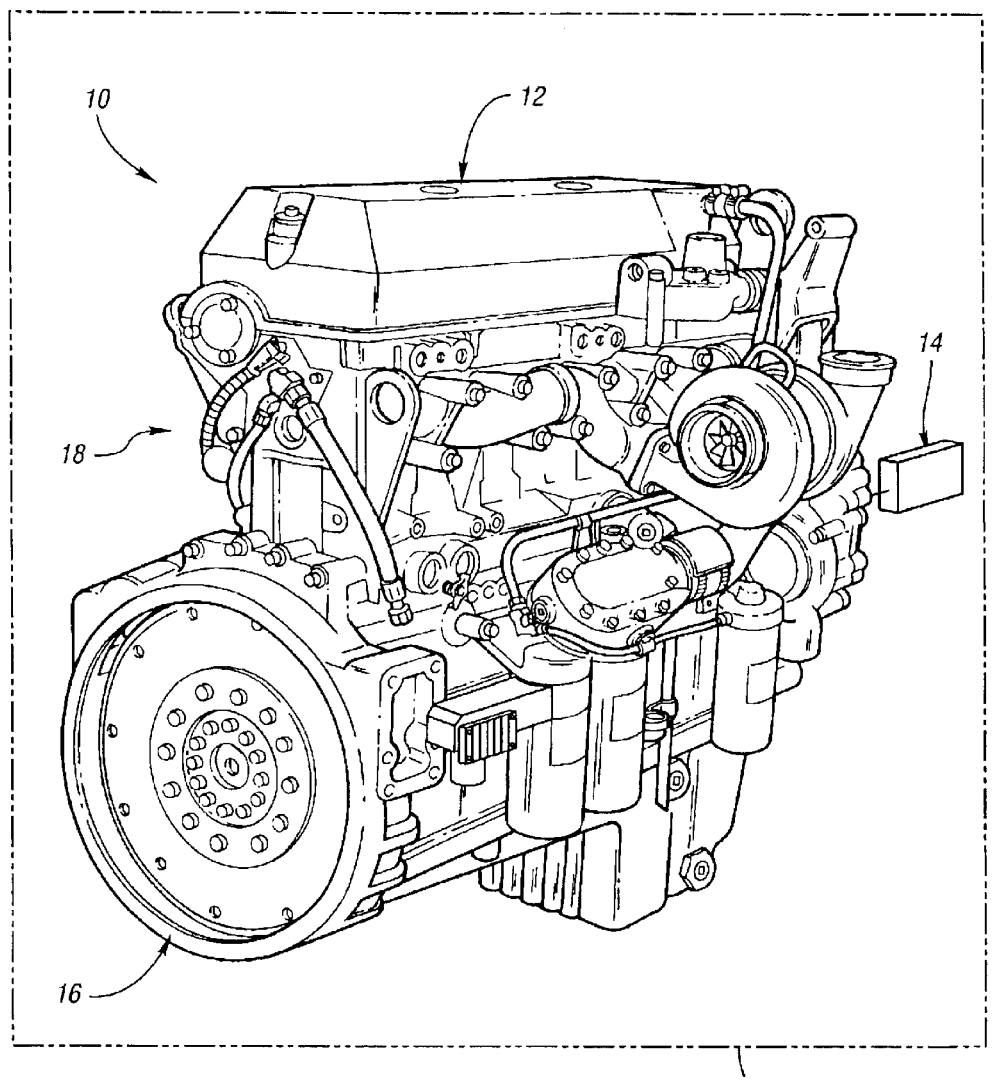
FIG. 1 is a diagrammatic view of equipment such as a vehicle or machinery and includes a perspective view of an engine control in accordance with the present invention.

FIG. 1 is a perspective view of a compression-ignition, internal combustion engine 10 incorporating various features of engine control according to the present invention. As will be appreciated by those of ordinary skill in the art, engine 10 may be used in a wide variety of equipment 11 for applications including on-highway trucks, construction equipment, marine vessels, and stationary generators, among others. Engine 10 includes a plurality of cylinders disposed below a corresponding cover, indicated generally by reference numeral 12. In a preferred embodiment, engine 10 is a multi-cylinder compression ignition internal combustion engine, such as a 4, 6, 8, 12, 16, or 24 cylinder diesel engine, for example. Moreover, it should be noted that the present invention is not limited to a particular type of engine or fuel.

Engine 10 includes an engine control module (ECM) 14. ECM 14 communicates with various engine sensors and actuators via associated cabling or wires, indicated generally by reference numeral 18, to form a controller 32 to control the engine and equipment 11. In addition, controller 32 communicates with the engine operator using associated lights, switches, displays, and the like as illustrated in greater detail in FIG. 2. When mounted in a vehicle, engine 10 is coupled to a transmission via flywheel 16. As is well known by those in the art, many transmissions include a power take-off (PTO) configuration in which an auxiliary shaft may be connected to associated auxiliary equipment which is driven by the engine/transmission at a relatively constant rotational speed using the engine's variable speed governor (VSG). Auxiliary equipment may include hydraulic pumps for construction equipment, water pumps for fire engines, power generators, and any of a number of other rotationally driven accessories. Typically, the PTO mode is used only while the vehicle is stationary. However, the present invention is independent of the particular operation mode of the engine, or whether the vehicle is stationary or moving for those applications in which the engine is used in a vehicle having a PTO mode.

Figure 2:
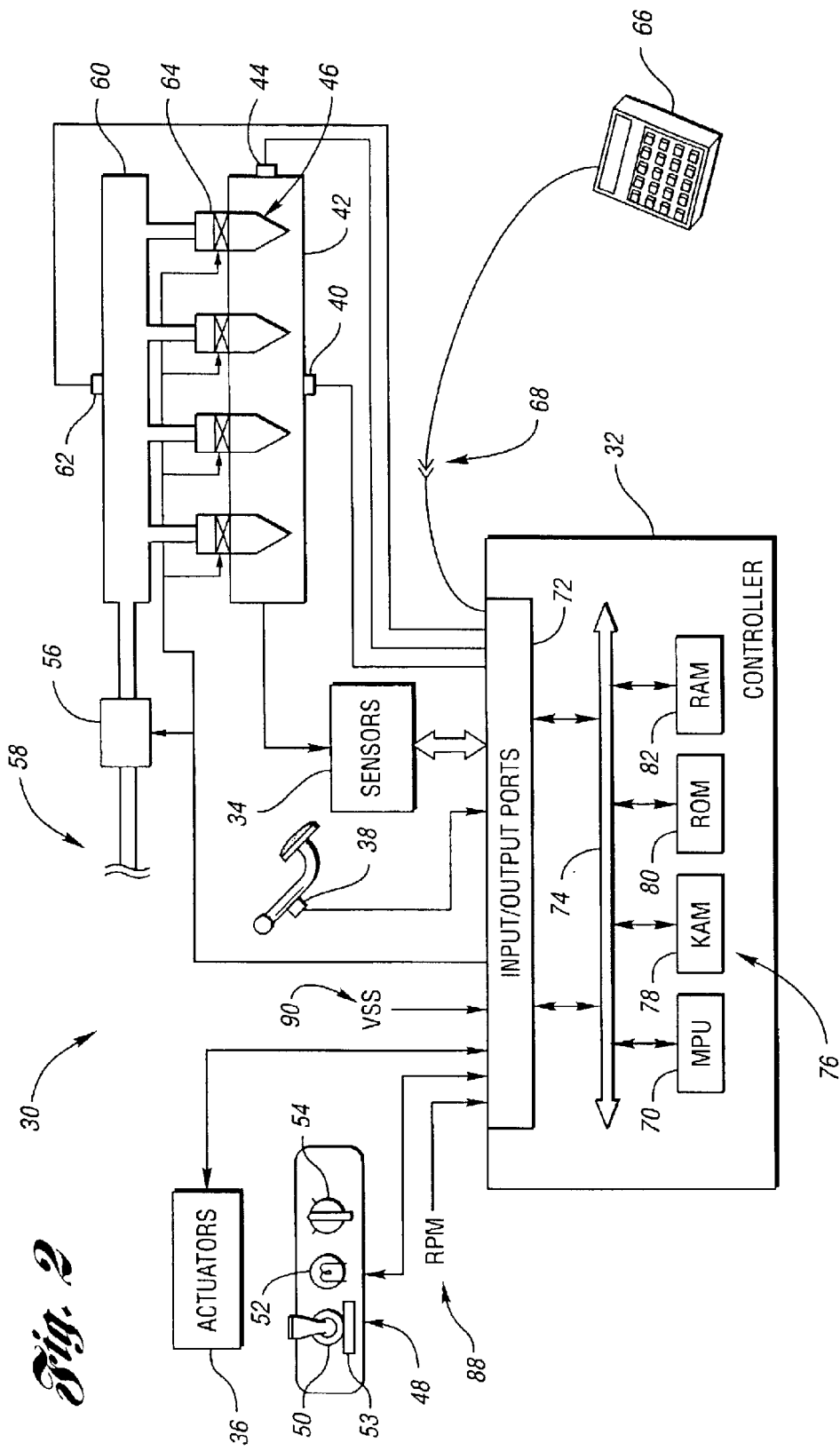
FIG. 2 is a diagrammatic and schematic view of a control system used in the equipment of FIG. 1.

Referring now to FIG. 2, a block diagram illustrating an engine control system 30 with limiting operation in a speed range according to the present invention is shown. System 30 represents the control system for engine 10 of FIG. 1. System 30 preferably includes a controller 32 in communication with various sensors 34 and actuators 36. Sensors 34 may include various position sensors such as an accelerator or brake position sensor 38. Likewise, sensor 34 may include a coolant temperature sensor 40 which provides an indication of the temperature of engine block 42. Likewise, an oil pressure sensor 44 is used to monitor engine operating conditions by providing an appropriate signal to controller 32. Other sensors may include rotational sensors to detect the rotational speed of the engine, such as RPM sensor 88 and a vehicle speed sensor (VSS) 90 in some applications. VSS 90 provides an indication of the rotational speed of the output shaft or tailshaft of a transmission (not shown) which may be used to calculate the vehicle speed. VSS 90 may also represent one or more wheel speed sensors which are used in anti-lock braking system (ABS) applications, for example.

Actuators 36 include various vehicle components which are operated via associated control signals from controller 32. As indicated in FIG. 2, various actuators 36 may also provide signal feedback to controller 32 relative to their operational state, in addition to feedback position or other signals used to control actuators 36. Actuators 36 preferably include components in addition to a plurality of fuel injectors 46 which are controlled via associated solenoids 64 to deliver fuel to the corresponding cylinders. In one embodiment, controller 32 controls a fuel pump 56 to transfer fuel from a source 58 to a common rail or manifold 60. Operation of solenoids 64 controls delivery of the timing and duration of fuel injection as is well known in the art. While the representative control system of FIG. 2 with associated fueling subsystem illustrates the typical application environment of the present invention, the invention is not limited to any particular type of fuel or fueling system.

Sensors 34 and actuators 36 may be used to communicate status and control information to an engine operator via a console 48. Console 48 may include various switches 50 and 54 in addition to indicators 52. Console 48 is preferably positioned in close proximity to the engine operator, such as in the cab of a vehicle. Indicators 52 may include any of a number of audio and visual indicators such as lights, that may be displayed or illuminated as a response to detection of engine operation in a speed range deemed undesirable, including displays, buzzers, alarms, and the like. Preferably, one or more switches, such as switch 50 and switch 54, are used to request a particular operating mode, such as cruise control or PTO mode, for example.

In one embodiment, controller 32 includes a programmed microprocessing unit 70 in communication with the various sensors 34 and actuators 36 via input/output port 72. As is well known by those of skill in the art, input/output ports 72 provide an interface in terms of processing circuitry to condition the signals, protect controller 32, and provide appropriate signal levels depending on the particular input or output device. Processor 70 communicates with input/output ports 72 using a conventional data/address bus arrangement. Likewise, processor 70 communicates with various types of computer-readable storage media 76 which may include a keep-alive memory (KAM) 78, a read-only memory (ROM) 80, and a random-access memory (RAM) 82. The various types of computer-readable storage media 76 provide short-term and long-term storage of data used by controller 32 to control the engine. Computer-readable storage media 76 may be implemented by any of a number of known physical devices capable of storing data representing instructions executable by microprocessor 70. Such devices may include PROM, EPROM, EEPROM, flash memory, and the like in addition to various magnetic, optical, and combination media capable of temporary and/or permanent data storage.

Computer-readable storage media 76 include data representing program instructions (software), calibrations, operating variables, and the like used in conjunction with associated hardware to control the various systems and subsystems of the engine and/or vehicle. The engine/vehicle control logic is implemented via controller 32 based on the data stored in computer-readable storage media 76 in addition to various other electric and electronic circuits (hardware).

In one embodiment of the present invention, controller 32 includes control logic to limit engine operation in a speed range by comparing the actual engine speed to an undesirable engine speed range and proceeding to generate at least one response signal changing speed of the engine outside the first and second thresholds of said range. Control logic implemented by controller 32 monitors operating speed of the engine or connected components. Likewise, a detector determines that the engine speed is within the first and second thresholds of a speed range. Controller 32 then drives the vehicle actuators to automatically adjust the engine speed when the time of operation between the first and second thresholds exceeds a programmable limit. Of course, depending upon the particular application, one or more ranges having thresholds may be monitored to limit operation in more than one speed range.

As used throughout the description of the invention, a selectable or programmable limit or threshold may be selected by any of a number of individuals via a programming device, such as device 66 selectively connected via an appropriate plug or connector 68 to controller 32. Rather than being primarily controlled by software, the selectable or programmable limit may also be provided by an appropriate hardware circuit having various switches, dials, and the like. Of course, the selectable or programmable limit may also be changed using a combination of software and hardware without departing from the spirit of the present invention.

Figure 5:
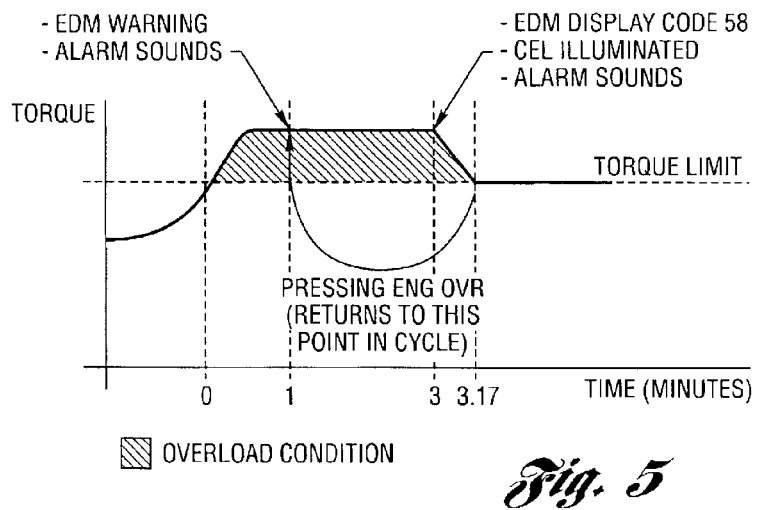
FIG. 5 is a graphic representation of an existing system modified to perform control in accordance with the present invention.
Figure 6:
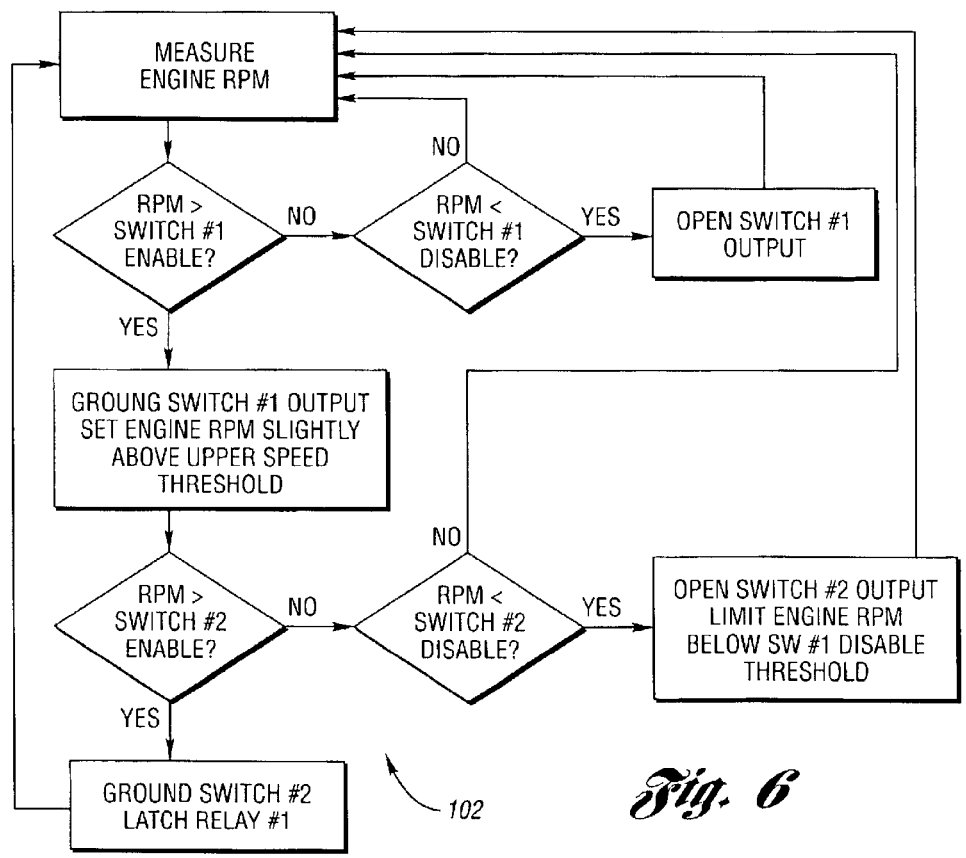
FIG. 6 is a block diagram of engine control methods programmed according to the present invention.
Figure 7:
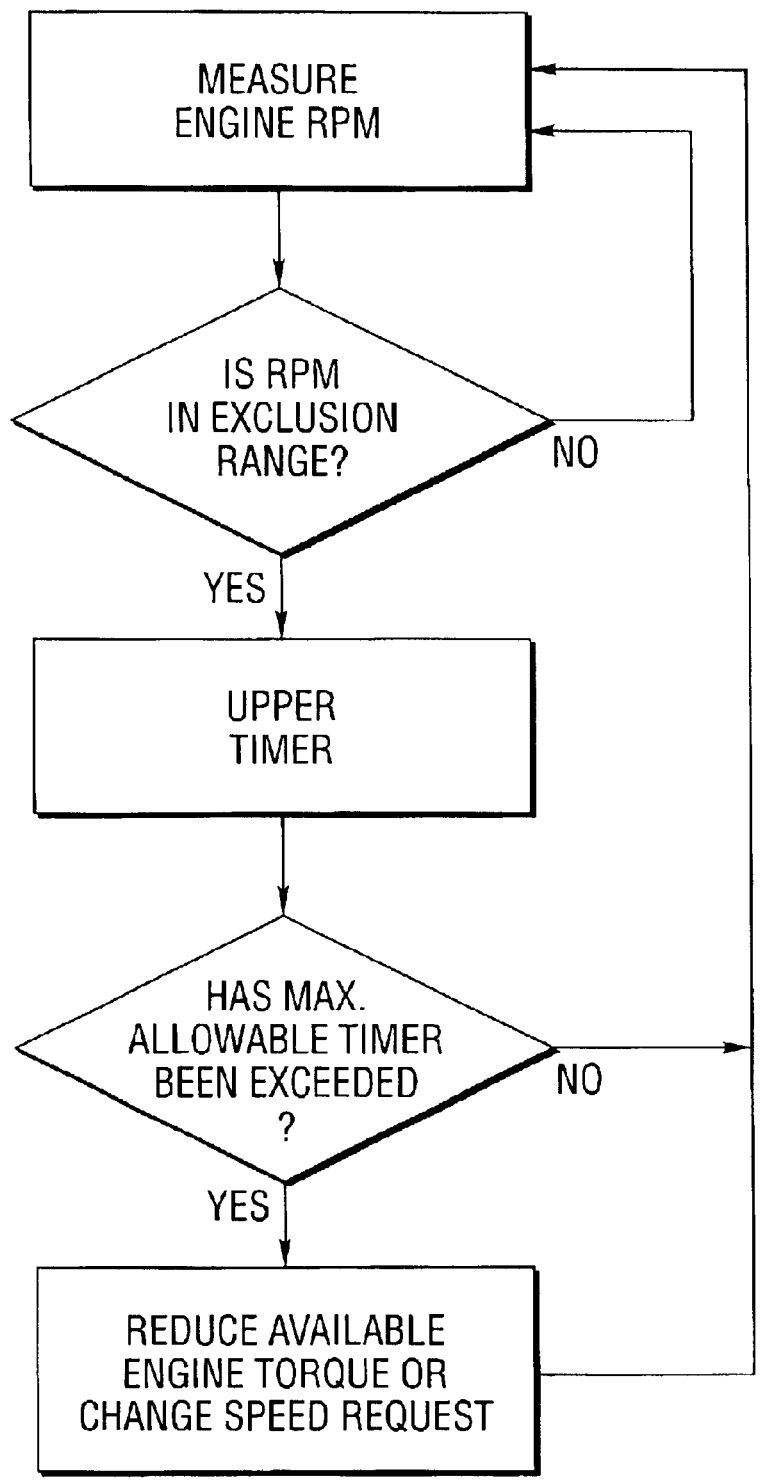
FIG. 7 is a block diagram of a modified engine control method program according to the present invention.

As will be appreciated by one of ordinary skill in the art, the block diagrams of FIGS. 6 and 7 represent control logic which may be implemented or effected in hardware, software, or a combination of hardware and software. The various functions are preferably effected by a programmed microprocessor, such as included in the DDEC controller manufactured by Detroit Diesel Corporation, Detroit, Mich. Of course, control of the engine/vehicle may include one or more functions implemented by dedicated electric, electronic, or integrated circuits. As will also be appreciated by those of skill in the art, the control logic may be implemented using any of a number of known programming and processing techniques or strategies and is not limited to the order or sequence illustrated in FIGS. 3–7. For example, interrupt or event driven processing is typically employed in real-time control applications, such as control of an engine or vehicle. Likewise, parallel processing, multi-tasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

Figure 3:
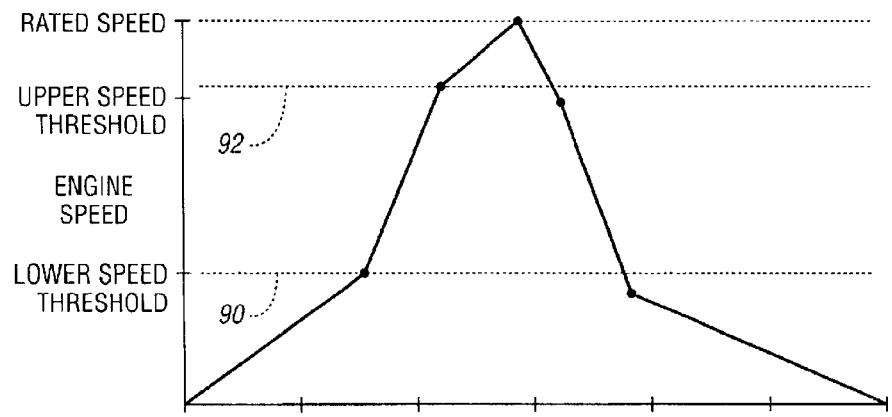
FIG. 3 is a graphic representation of speed changes over time according to an embodiment of the present invention.
Figure 4:
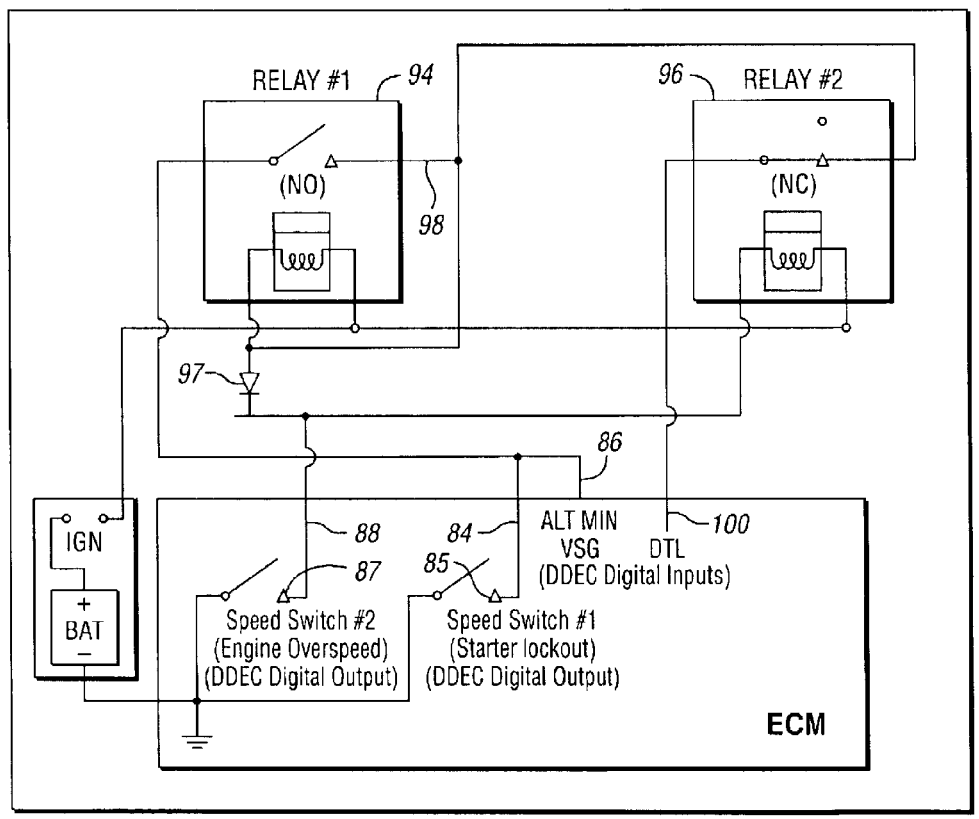
FIG. 4 is a schematic diagram of an embodiment of the present invention formed with discrete circuitry.

Referring now to FIG. 3, a preferred, automatic method for avoiding operation in a programmable range of engine speeds is graphically demonstrated. As the operator increases request for speed, the engine will automatically pass through the programmable exclusion range. In addition as the engine speed is decreased, the engine will automatically pass through the programmable exclusion range. One embodiment of the automated method uses two engine speed outputs 84 and 88, one speed command input 100, one torque or one speed limit input 86, two relays 94 and 96 and a diode 97. An embodiment of such components is shown in FIG. 4. The FIG. 3 graphic representation of speed over time shows sequential requests for increasing speed, and then decreasing speed requests as made by the equipment operator. For example, the speed switch #1 shown at 85 may be formed by the speed switch output port of the DDEC IV controller. That port provides a signal, previously Starter Lockout used to inhibit starter reengagement, as well as errors indicators such as engine overspeed in other control modules, while the engine is running above a calibrated speed. Previously, an open circuit at the port enables the starter to be reengaged when the engine is below a calibrated speed, for example 60 RPM. The output signal enable and disable thresholds, related to selected RPM values, can be set to any value and are programmable by various tools. Similarly, the polarity can be programmed as desired. A digital output is also used to indicate that the engine is running. The application code system (ACS) sets the default function, number and polarity for programming each of the inputs and six digital output ports. The function of the output port may be ordered at the time of engine order or configured by a vehicle electronic program system (VEPS) tool or a distributor reprogramming system (DRS) tool. Similarly, the RPM values or the polarity can be set as desired.

Referring now to FIG. 4, when the engine speed reaches a low speed threshold, for example, the presettable speed at which speed switch #1 shown at 85, the output 84 is enabled. In the preferred embodiment, enabling is preferably by switching the output to ground as shown in FIG. 4, though the system 30 could operate with opposing polarity without departing from the invention. The output signal 84 is used to enable the engine speed command input 86, for example with the DDEC digital input previously used for alternative minimum variable speed governor (ALT MIN VSG), which is programmed to set the engine target speed slightly above the upper speed threshold 92 (FIG. 3). In addition, the speed switch #1 output 84 is used to provide ground on the common input to a first relay 94, for example, at pin 30 on a standard Bosch relay.

The second speed switch 88 is programmed to an engine speed above the upper speed threshold 92 and below the target speed generated once the first speed switch 94 has enabled the engine speed command input. When the speed switch 88 is enabled, it energizes both relays 94 and 96. Relay 94 is latched once it is energized because the ground signal from the speed switch #1 signal output 84, which was previously supplied to the common input (e.g. pin #30), is now connected via the normally open contact 98 directly to the ground side of the coil of relay 94. The normally closed output of relay 96 is open circuited, preventing the ground from enabling the engine speed limit function.

The engine control command should set a target speed or target torque level sufficiently high to avoid cycling between the upper speed range threshold 92 and the lower speed range threshold 90. For example, the speed switch #2 at 88 may be the (formerly engine overspeed) digital output of a DDEC IV controller whose digital output is switched to ground when the low side digital output is used, or switched to battery positive when the high side digital output is used. Switching occurs when a calibrated value, for example, an engine overspeed enable speed threshold, is exceeded. The engine speed command value is programmable.

In the preferred embodiment, when the engine speed drops below the speed switch 88 disable speed, the port is open circuited and de-energizes relay 96. Since relay 94 is latched, the relay output 98 provides a ground to enable engine limiting speed input 100 through the relay 96 which is normally closed. Once enabled, the speed limit input 100 forces the engine speed below the speed switch 84 disable threshold and de-energizes the relay 94. In a working example, where programmable parameters limit operation between 1400 RPM and 1600 RPM, the engine speed command (DDEC Alternate Minimum VSG) is set to approximately 1630 RPM. The speed switch #1 84 output enable limit is set at 1400 RPM. The speed switch #1 84 disable limit is set at 1390 RPM. The speed switch #2 88 output enable limit is set at 1610 RPM. The speed switch #2 88 disable limit is set at 1600 RPM. The ACS torque limit RPM, which is the engine limiting RPM, may be set at 1200 RPM. Diode 97 allows only output 88 to control relay 96. Without diode 97 relay 96 would remain energized until out 84 and output 88 are disabled.

Figure 8:
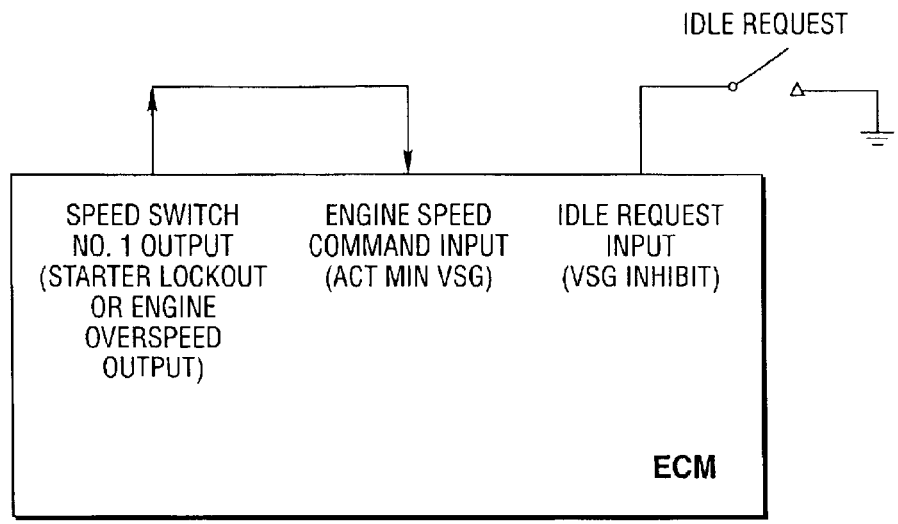
FIG. 8 is a schematic diagram of a modified embodiment alternative to FIG. 4 according to the present invention.

As shown in FIG. 8 another variation is to have the speed switch 84 output enable the engine speed command input. The command input 86 is programmed at the upper speed threshold, for example, 1600 RPM in the above example, so that when the input 86 is enabled, the engine will accelerate to the commanded speed. The operator can vary the engine speed between the upper speed threshold (command engine speed) 92 and the rated engine speed. If the operator desires to operate in a lower speed range, the operator manipulates a switch that enables an idle request input. This method is simpler to implement but requires additional operator intervention, rather than fully automatic response as described above. In such a modification, the required digital inputs from the electronic control module 14 would be the idle speed request (Variable Speed Governor Inhibit) and engine speed command (Alternate Minimum VSG). In addition, two speed switch outputs are used, such as the DDEC speed switch output and Engine Overspeed output. For this application, as the operator makes a request for a change in speed above idle, the engine operates in a range from idle up to 1400 RPM. Once the engine reaches the 1400 RPM threshold, the speed switch output (formerly Starter Lockout) digital output 84 is enabled, providing a ground signal to the input 86 (formerly Alternate Minimum VSG) which immediately commands the engine speed to ramp up to 1600 RPM. Alternatively, the speed switch output 84 may also be connected to a relay operated switch in series with the idle request switch in order to prevent idle requests below 1400 RPM. When the (formerly Alternate Minimum VSG) input 86 is enabled, the engine speed range is now from 1600 RPM up to rated engine speed.

Referring now to FIG. 5, a second method for implementing the limiting of operation in a speed range between first and second thresholds uses a timer based torque limiting feature. For example, an existing marine engine control's torque limiting feature intended to allow the maximum requested torque table to be calibrated at an excessive power level to allow vessels to accelerate upon planing momentarily, but not to run at that excessive power level for long continuous operation. The feature may be programmed to react after a time interval exceeding that allotted by the calibrated timer values in the ECM 14 to reduce torque throughout the undesirable engine operating speed range, if the engine dwells in the undesirable speed range for a time interval allotted by the calibrated timer. This method provides the advantages of not requiring additional software, and no wiring changes as the feature is enabled by setting a calibration parameter. This feature limits available power in the programmable speed range, whereas the previously described embodiment limits the time of engine operation in the programmable speed range.

As shown in FIG. 5, an engine overload protection prohibits operation of the engine at a torque level above the normal propellor load curve for prolonged periods of time. An audible warning may sound and a warning message may be displayed, for example at indicator 52, when engine output exceeds the maximum allowed torque curve for more than one minute. After an additional time period, for example two minutes, the check engine light (CEL) at 52 illuminates and code 58 may be displayed at an LED display 53. The engine output will ramp down to the maximum allowed torque curve. The system may be overridden by pressing and releasing Engine Override button (ENG OVR) at the active control station 48.

Figure 9:
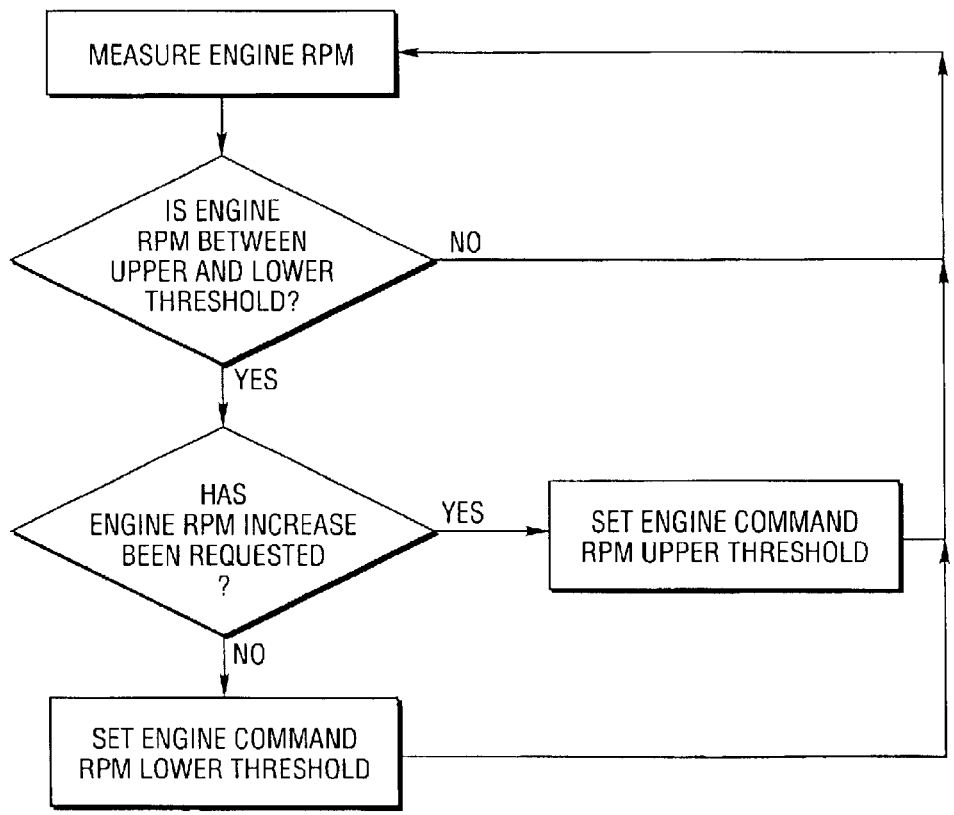
FIG. 9 is a block diagram of a method embodiment according to the present invention.

As shown in FIG. 9, another version of implementing the method for controlling the engine with the engine control involves the implementation of new software in the controller. In this method, calibrateable minimum and maximum thresholds are determined to select the range in which engine operation has been determined to be undesirable. The method of enabling the feature may consist of the creation of a digital input based on a programmable calibration parameter, for example Engine Speed Range Exclusion input enable, preferably incorporated as a part of the electronic control module 14. When the feature is enabled, if the requested speed, or the equivalent speed based on torque request, exceeds the minimum threshold, the engine will accelerate through the programmed threshold. The engine speed would remain above the upper threshold until the engine speed request dropped below the minimum threshold. Once the speed request has dropped below the minimum threshold, the control will stop fueling the engine until it has at least dropped below the minimum threshold engine speed. Of course, a hysteresis is preferably implemented to avoid repeated cycling.

Another preferred method would allow a calibrateable "PTO Input Raw Counts To Set Speed" table. In this method, a table is added that, instead of using the offset and gain for the power takeoff input, which could look up the raw count and correlate that to an engine speed. This would allow flexibility on ranges and permit multiple ranges and even a splined curve that is not linear. The PTO Input Raw Counts may be any engine speed governing control in previously known electronic control modules.

As shown in FIG. 6, a flow chart shows a method as described with respect to FIG. 4. In addition, FIG. 7 demonstrates a simplified block diagram for implementing a method embodiment according to the present invention.

In any event, the present invention provides an engine control that limits operation in speed ranges between first and second thresholds that are deemed undesirable. The upper and lower limits of the thresholds, as well as the upper and lower limits for each switch that may be employed in operating the system, may be set as desired during construction of the control module or subsequently programmed into the device. Having thus described the present invention, many modifications thereto will become apparent to persons skilled in the art without departing from the scope and spirit of the present invention as defined in the appended claims.

What is claimed is:

1. A method for limiting operating of an engine with an electronic control module and a throttle control in at least one speed range determined to be undesirable, sensing when said engine operation is at a first threshold of said range, responding to said sensing by generating a command for a changed operation for said engine different from said threshold, and commanding a powertrain output adjustment for continued operation outside said range defined by said first threshold and a second threshold in a time period subsequent to said sensing step.

2. The invention as described in claim 1 wherein said commanding comprises commanding an engine speed adjustment.

3. The invention as described in claim 1 wherein said commanding is a fuel adjustment command.

4. The invention as described in claim 1 wherein said commanding comprises commanding a torque response.

5. The invention as described in claim 1 wherein said commanding comprises commanding a transmission shift.

6. The invention as described in claim 1 wherein said responding comprises automatically switching an input to said electronic control module.

7. The invention as described in claim 6 wherein said switching comprises at least one relay responding to a speed sensing switch.

8. The invention as described in claim 7 wherein said switching comprises a second relay responding to a second speed sensing switch.

9. The invention as described in claim 1 wherein said responding comprises indicating a sensed condition and manually switching an input to said throttle control.

10. The invention as described in claim 1 wherein said responding comprises time counting said engine operation at said speed range to define an interval, and said avoiding comprises terminating throttle control in said speed range subsequent to said interval.

11. The invention as described in claim 1 wherein said responding comprises reprogramming said engine operation in said electronic control module.

12. The invention as described in claim 11 wherein said responding comprises inputting a response to said electronic control module.

13. The invention as described in claim 11 wherein said reprogramming comprises selecting a table of operating commands.

14. An engine control for a compression-ignition internal combustion engine that switches engine operation out of a speed range defined between first and second thresholds, the control comprising:

a sensor detecting when said engine operation passes said first threshold, a controller input responsive to said detecting for processing a predetermined response, and a controller commanding a change to an engine operating parameter to adjust engine operation to a level outside said range defined by said first and second thresholds in a time period subsequent to said sensing step.

15. The invention as described in claim 14 wherein said control comprises a discrete component circuit generating said input to an electronic control module.

16. The invention as described in claim 14 wherein said control comprises a software program in an electronic control module.

17. A computer readable storage medium having data stored therein representing instructions executable by a computer to control a compression ignition internal combustion engine installed in a vehicle to perform a speed range avoiding adjustment feature, the computer readable storage medium comprising:

instructions for detecting when a signal representing engine speed corresponds to a range of speeds defined between upper and lower thresholds of said speed range;

instructions for responding to said detecting by generating a command for operating said engine at a level outside said range, and instructions for commanding an engine parameter change to adjust engine operation outside of said range defined between said upper and said lower thresholds in a time period subsequent to said detecting.

18. The invention as described in claim 17 wherein said storage medium comprises instructions including a table of operating commands for at least one engine operating parameter.

19. The invention as described in claim 17 wherein said instructions include a selectable override feature.

* * * * *